Oct. 6, 1959    A. G. ROBERTS ET AL    2,907,200
APPARATUS FOR MEASURING ABRASION RESISTANCE
Filed Feb. 14, 1956    2 Sheets-Sheet 1
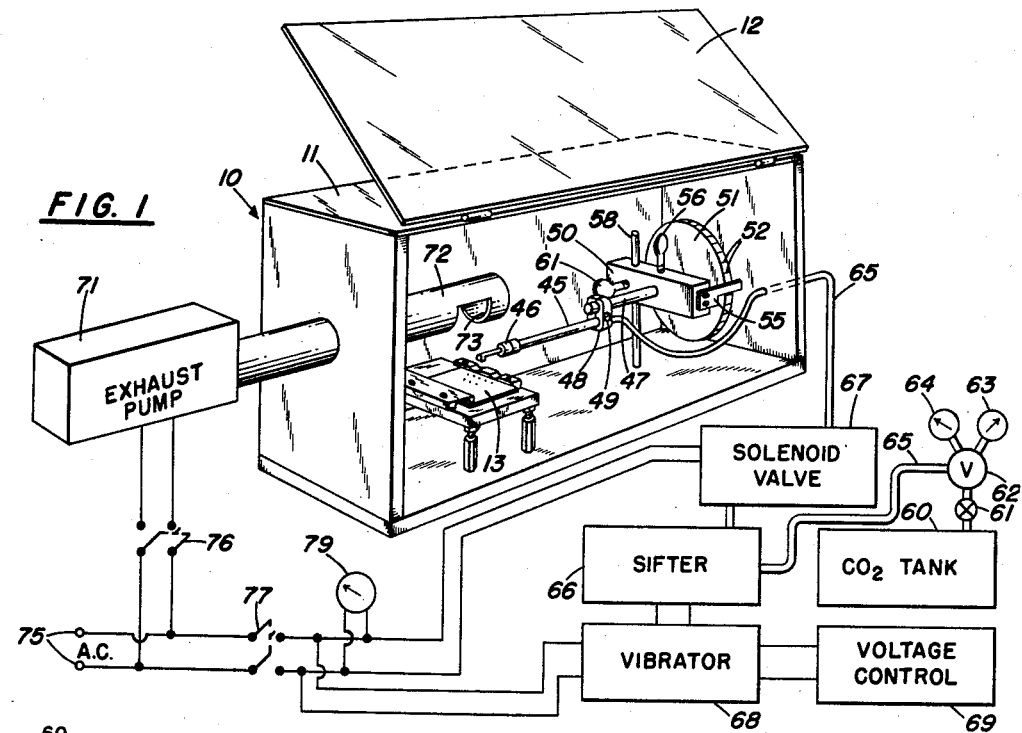
FIG. 1
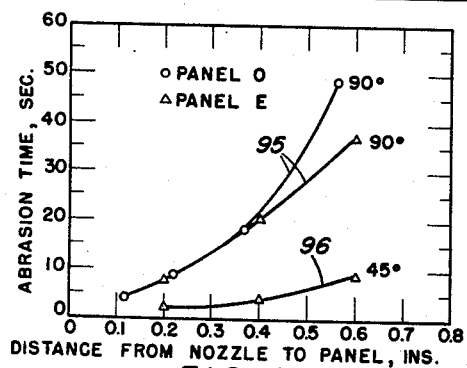
FIG. 6
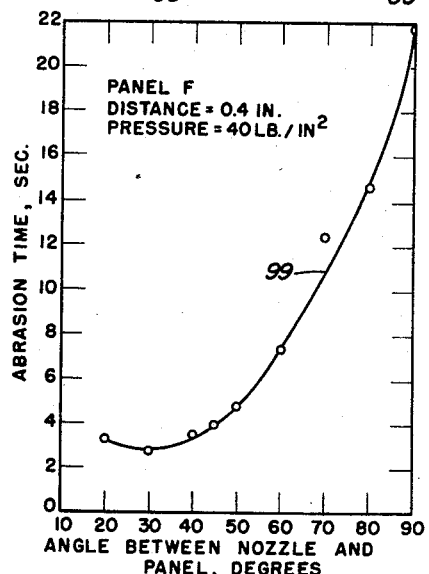
FIG. 8
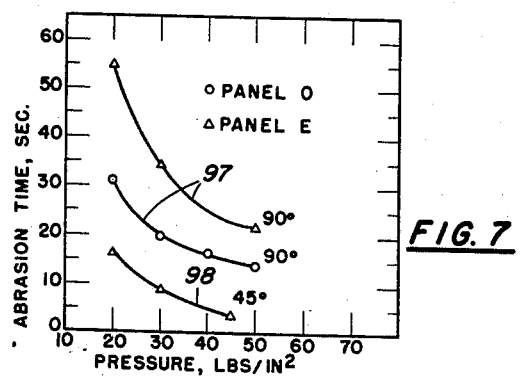
FIG. 7
INVENTORS
AARON G. ROBERTS
WILLIAM A. CROUSE
ROBERT S. PIZER
BY
ATTORNEYS Oct. 6, 1959   A. G. ROBERTS ET AL   2,907,200
APPARATUS FOR MEASURING ABRASION RESISTANCE
Filed Feb. 14, 1956   2 Sheets-Sheet 2
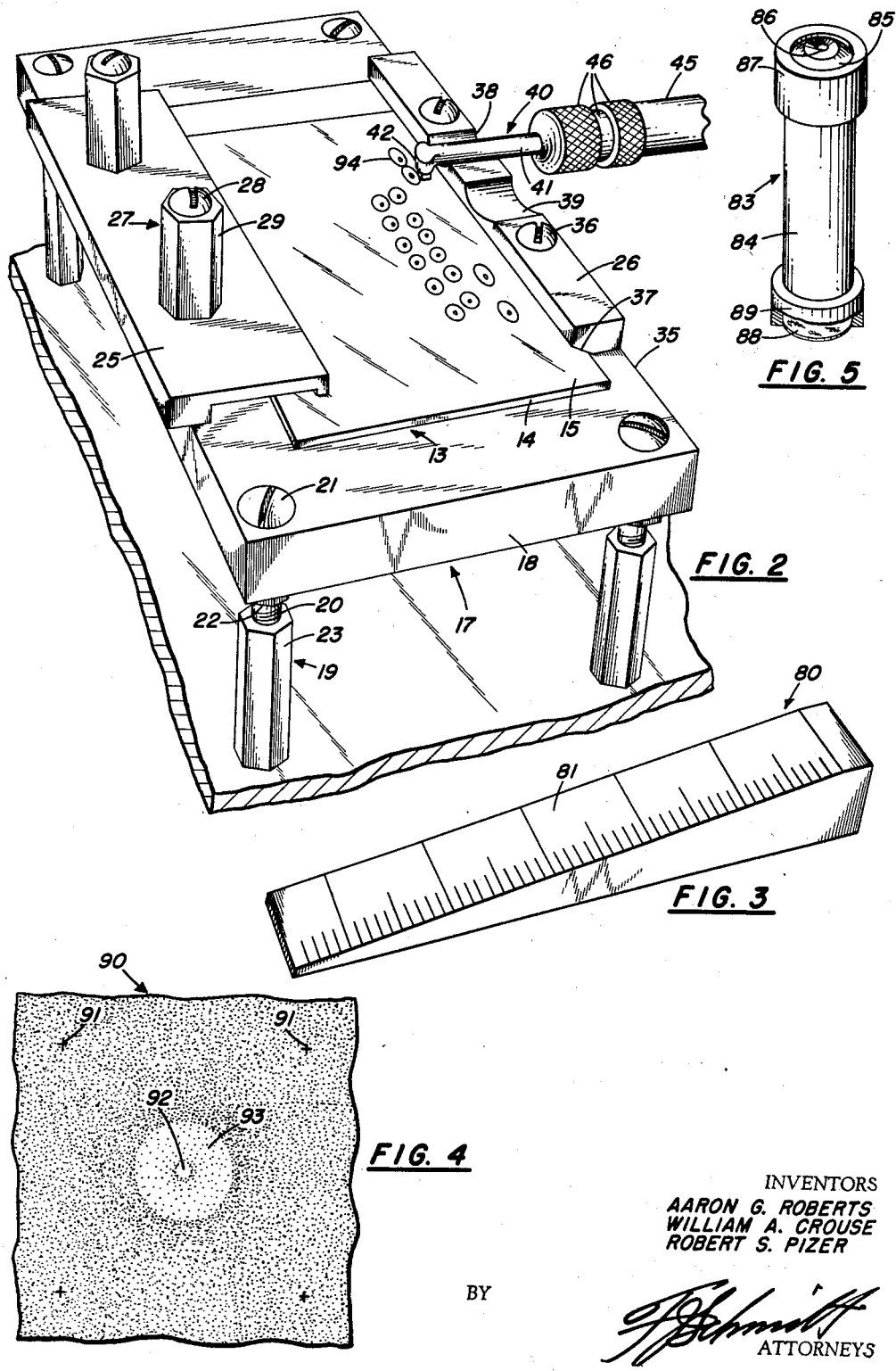
INVENTORS
AARON G. ROBERTS
WILLIAM A. CROUSE
ROBERT S. PIZER
BY 
ATTORNEYS

United States Patent Office 2,907,200
Patented Oct. 6, 1959

2,907,200

APPARATUS FOR MEASURING ABRASION RESISTANCE

Aaron G. Roberts, Silver Spring, and William A. Crouse, Bethesda, Md., and Robert S. Pizer, Washington, D.C., assignors to the United States of America as represented by the Secretary of the Navy Application February 14, 1956, Serial No. 565,518

2 Claims. (Cl. 73—7)

(Granted under Title 35, U.S. Code (1952), sec. 266)

The invention described herein may be manufactured and used by or for the Government of the United States of America for governmental purposes without the payment of any royalties thereon or therefor.

This invention relates to an apparatus for measuring the abrasion resistance of coatings on solid structures. The invention has particular utility as applied to the measurement of abrasion resistance of protective organic coatings.

Abrasion resistance is often one of the most important factors in the service performance of protective coatings. For example, in the case of military aircraft the frontal resistance of the fuselage to sleet and the like and the resistance of the plane sides and underparts to scuffing wear resulting from servicing operations have a direct bearing on coating maintenance. In prior methods, use is made of abrasive particles which fall, rub or blow against the coating of the test specimen. In the present method, equipment is used which permits greater ease and rapidity in evaluating material, generally better reproducibility through the use of a continuously fresh supply of abrasive particles under closely controllable conditions, greater versatility in readily providing a variety of test conditions, and the use of relatively simpler equipment in that photoelectric devices, motors and drive mechanisms are not required. Moreover, the apparatus is applicable to all types of coatings regardless of color, gloss or thickness and does not depend upon the abrasion of a fixed area of coating surface.

Generally stated, the object of the invention is to provide a simplified and effective apparatus for measurement of the abrasion resistance of coatings, particularly organic coatings, on solid substances, such as metals. An object, also, is to provide jet abrasion apparatus for coating resistance determination which permits rapid evaluation of results. Other objects are to provide abrasion resistance determination apparatus which is versatile in use, readily reproducible in action, and simple in construction.

Other objects and many of the attendant advantages of this invention will be readily appreciated as the same becomes better understood by reference to the following detailed description when considered in connection with the accompanying drawings wherein:

Fig. 1 is a schematic drawing of the apparatus with the specimen abrasion chamber shown in perspective;

Fig. 2 is a perspective view of the specimen table holding a test panel, with the abrasion nozzle positioned for abrasive action;

Fig. 3 is a detailed view showing the distance gage for the jet;

Fig. 4 is a detailed view showing an abraded coating of a specimen;

Fig. 5 is a detailed view of a tube for determination of the rate of abrasive flow in the jet;

Figs. 6, 7 and 8 are curves illustrating change of time for change in nozzle-to-panel distance, jet abrasion pressure and angle between nozzle and panel, respectively.

The equipment, generally stated, includes a specimen support and an abrasion jet with apparatus to supply abrasive material to the jet and to permit jet manipulation to secure the desired results. In Fig. 1 the specimen and jet supports are mounted in a single container 10, preferably provided with a transparent top 11 and a hinged front door 12 made of plastic, glass or the like. The specimen panel 13, consists of a plate 14 (see Fig. 2) on which is a coating 15 of paint, enamel, lacquer or the like, and this specimen is placed inside the container on a table 17. The table is provided with a plane slab 18 at the far corners of which are placed adjustment supports 19, each adjustment support consisting of a screw 20 with a grooved head 21, a lock nut 22 and an adjustment nut 23. Through adjustment of nuts 23 the level of the slab may be leveled or angled as desired.

The panel 13 is retained in position for abrasion on the table 17 through use of two elongated clamp bars 25 and 26. Bar 25 extends over half the length of the table and is secured thereto along the long table edge by means of screw bolts 27, each bolt consisting of a screw having a grooved head 28 and an elongated nut 29, threaded and soldered to the screw, the screw having threaded engagement through the table plate 18. The bar 25 on its under or table side is widely grooved to form at the inner edge thereof a rib extending along the entire bar edge for engagement with the panel. Bar 26, likewise, extends over half the length of the table and is secured to table edge 35 by means of screws 36. The lower surface of bar 26 is flat except at the lower inner edge 37 which is cut away to form a diverging surface for receiving panels of varying thickness. The top edge of bar 26 is flat except for two large transverse grooves 38 and 39 adapted for reception of the abrasion jet as will now be described.

The abrasion jet 40 includes a straight hollow stem 41 and a nozzle 42, the nozzle being fixed to the stem end and opening at right angles to the stem. As shown in Fig. 2, the nozzle is short in length, its tip, when the nozzle is vertical to the table top, and the stem lies partly within groove 38, being closely spaced from the panel. However, this showing is merely by way of illustration, since, as will become apparent, the nozzle is susceptible to wide adjustment so as to secure any desired spacing from the panel surface.

The nozzle stem 41 is secured to one end of the hand piece stem 45 by means of screw couplings 46, the other end of stem section 45 being attached to a supporting pin 47 by an offsetting clamp 48. The clamp 48 is formed of two double-U allochiral sections which are held in mating position by screw 49, each clamp fitting over the held section of stem 45 and pin 47 so that by releasing the screw 49 the stem may readily be adjusted relative to the panel. Further, the pin 47 projects through the horizontal holding bar 50 and terminates in a disk 51, having edge markers 52 thereon, which may be manually moved at will to rotate the pin 45 and, thereby, the pendant clamp 48, the hand piece stem 45 and the nozzle 40. A reference plate 55, with a straight upper edge is attached to pin support 50 and extends over the disk edge so that predetermined gradations of wheel rotation may be made. A thumb screw 56, in support 50, is provided for locking the disk adjustment at any desired point.

Elevation of the support pin 50 is obtained by a vertical rod 58, fixed to the container base and extending through the support, a thumb screw 61 being used to lock the support at any desired elevation.

The accessory equipment of the abrasion unit is selected for bringing a controlled flow of abrasive particles to the abrasion jet 40. Use is made of a dry inert gas such as carbon dioxide for propelling the abrasive particles, this gas being supplied under pressure, as in container 60. Gas tanks of this type usually have a valve 61 in the outlet, and to this valved outlet is attached an automatic pressure valve 62 of conventional type which may be set for the required line pressure desired. Meter 63 gives the gas pressure on the tank side of the valve 62 and meter 64 the pressure in the pipe line 65 connecting valve 62 to the jet 40. Interposed in this pipe line are two control elements, the sifter 66 and the solenoid valve 67. The sifter, which is also of conventional form, includes an upper chamber for abrasive particles the base of which is provided with a screen of numerous small holes. Under static conditions there is small tendency for the particles to pass through these holes; but when the unit is vibrated, as by vibrator 68, the particles flow through the holes at a rate depending directly on the amplitude of vibration and this amplitude is determined by the setting of voltage control 69 in relation to the magnetic vibrator 68. The lower chamber of the sifter forms a passageway below the sifter screen which connects at one end through pipe line 65 to the pressure valve 62, and at the other end with the solenoid valve 67 and thence through the pipe line to nozzle 40 within the abrasion chamber. It is apparent, therefore, that when abrasive powder is being sifted into the flow chamber beneath the screen, gas under pressure, passing through this chamber, will sweep the particles through the pipe line to the jet nozzle. During continuous operations, the sifter abrasive chamber should be refilled at intervals which are usually around 25 minutes.

In addition to the above-described equipment, air moving means for the abrasion container 10 is used including the exhaust pump unit 71 provided with an outlet tube projecting into the container to a point overlying the specimen table and abrasive nozzle, the end of the tube being closed so that suction is concentrated in an opening 73 formed on the lower side of the tube about two inches directly above the abrasion tube jet. In this way, all spent abrasive gas mixture is continuously removed from the specimen area during the test period.

Electric circuit connections are diagrammatically indicated for the apparatus, alternating current being derived from source 75 and passed through switch 76 to the vacuum pump, through switch 77, which is preferably of the toggle type, to the solenoid valve 67 and to the vibrator and vibrator voltage control. A stop watch 79 is connected in the circuit between switch 77 and the solenoid valve 68.

In using the equipment the specimen panel is first placed securely in position on table 17 in the desired relationship to the nozzle. It is desirable from the viewpoint of accuracy that several abrasion coating resistance tests be made over a spread area. In addition, it is frequently desirable to make tests on the same coating involving different variables, that is, pressure of abrasive impact, distance between panel and nozzle tip, and the angle of abrasive flow to the panel. To this end, the panel table is leveled by supports 19, the nozzle tip angled at the desired value by means of the angle gage 51, the thumb screw 56 being used to hold the nozzle in the set position, and the nozzle unit, as a whole, is then spaced from the container base on vertical rod 58, the thumb screw 61 holding it in adjusted position.

To set the nozzle tip at the desired distance from the panel for each of several duplicate tests, use is made of the taper gage 80, as shown in Fig. 3, this gage being in the form of an elongated right-angled prism with the longer side 81 being graduated in terms of perpendicular distance between the nozzle tip and specimen panel, gradations of 0.01 inch being used. The distance readings are direct for nozzle angle of 90 degrees from the panel surface. Where angles of 20 to 90 degrees are involved the gage mark to which the nozzle angle is set is interpreted by reference to a calibration chart.

Determination of abrasive flow rate is, also, important to secure duplication of tests. This is accomplished by use of the weighing tube 83, shown in Fig. 5 consisting of a cylindrical tube 84 capped at one end by a rubber diaphragm 85, having a small central opening 86 and retained by band 87 and at the other end provided with a filter paper 88 retained by band 89. To determine the abrasion flow rate this gage is slipped over the nozzle by way of the diaphragm opening 86 and the weight of abrasive for a fixed time of flow is obtained. This is repeated until the desired flow rate is secured.

In operation, the desired rate of abrasive flow as measured by gage 83 is obtained through adjustment of valve 62 and voltage control 69. The panel table being adjusted to a proper level, the specimen panel is clamped to the table plate, and the nozzle placed at the required angle and elevation, using the taper gage 80 and the manual adjustments afforded by support rod 58 and angle gage 51. The exhaust pump is then turned on, and the transparent door 12 closed. The toggle switch 77 is now closed, energizing the vibrator to cause sifting of powder to the lower vibrator chamber from which it is swept by the gas on opening of the solenoid valve, the abrasive mixture, under pressure, moving into abrasive contact with the panel coating and the removed coating particles being drawn through opening 73 into the outlet tube 72. The flow of abrasive is continued until the first view of the substrate appears at the approximate center of the abrasive stream. This is usually at once apparent due to color or gloss difference between the coating and substrate as shown in Fig. 4, but where this distinction is absent, the break-through is determined by a magnifying glass. Switch 77 is then opened, the time is recorded for the test and the nozzle moved to the next test point where, under the same conditions of the first test, a second test is made. At least five tests should be made over the same coating surface to secure a reliable average value, the number of tests being dependent on the variability of the thickness values. In the case of dip coated panels, for example, there may be a small gradient from top to bottom of the panel but the side thicknesses would be uniform. In general, it has been found desirable to fix the nozzle and move the panel to bring a line of successive test locations into testing position; or tests may be made also at the four corners and center of a small square, (Fig. 4), the square center being also the panel center. The average of the test values secured at these points has been found to be usually representative of the abrasion resistance of the panel.

The effect of certain variables on the abrasion time for coating is illustrated by the curves of Figs. 6, 7 and 8. Fig. 6 illustrates the effect on abrasion time of distance variation between the panel coating and the nozzle tip, the increase in abrasion time with increasing distance being nearly linear over the range investigated. This increase in time is associated with the spreading of the abrasive particle flow with distance, thus decreasing the density of the flow reaching the test area. The time difference between the 90 degree curves 95 and the 45 degree curve 96 is apparent. In Fig. 7 the effect on abrasion time of pressure variation in the abrasive gas stream is indicated, the time decreasing non-linearly, approaching a limiting value in excess of 30 pounds per square inch, this being due, in part, to the greater frictional resistance the particles encounter in traveling through the nozzle and tubing. Here, also, the 45 degree nozzle erodes more rapidly than the 90 degree nozzle, curves 97 and 98 being derived from the same panel area. The effect of nozzle angularity is strikingly indicated in Fig. 8, the curve 99 showing time decrease slowing down with angle shift from 90 degrees toward 0 degrees, approaching a limiting value around 30 degrees where the time change reverses. Curve 99 shows that at 45 degrees the abrasive action approaches five times the abrasive rate at 90 degrees. Fig. 4 illustrates not only the contrasting substrate but also the partially abraded area 93 surrounding the exposed central area 92, this view being taken after a 90 degree nozzle test. Elliptical areas are usually exposed for nozzle angles less than 90 degrees, as shown at 94 in Fig. 2.

Analysis of the abrasive action indicates two types of coating disintegration depending on the angle of attack. Abrasive particles striking normally to a coating surface tend to compress, scar and cut into the coating so that surface particles are ultimately undercut and removed. On the other hand, particles striking the coating surface at grazing incidence tend to shear through minutely thin layers of the coating in successive slices and thus, eventually wear it away. Between these two extremes, the abrading action is a combination of the two types mentioned depending on the abrading angle, these types approaching equal importance at an incidence of about 45 degrees. Consequently, the 90 degree tests tend to simulate the leading-edge type of erosion encountered by aircraft on flight while the 45 degree tests tend to simulate the scuffing type of wear which aircraft receive during maintenance operations when they are walked upon or struck or scraped by hose nozzles and the like.

No special limitation of the abrasive material has been found necessary other than that the material should be sufficiently hard and, in powder form, free flowing and of appropriate shape to produce an adequate cutting action. Both aluminum hydrate and aluminum oxide have been found usable. In the case of aluminum oxide, the average particle size found useful is 27 microns with very few fines less than 10 microns and very few particles coarser than 270 mesh.

Obviously many modifications and variations of the present invention are possible in the light of the above teachings. It is therefore to be understood that within the scope of the appended claims the invention may be practiced otherwise than as specifically described.

What is claimed is:

1. An abrasion resistance determination apparatus comprising a rectangular enclosure having a transparent top and a hinged door, a specimen support table mounted within said enclosure on the bottom side and at one end thereof, means on the table for adjusting its height and for clamping the specimen on its surface, a vertical rod within the enclosure fixed to the bottom side of said enclosure at an end opposite to the table, a holding bar vertically slidable on said rod, means for adjusting the position of said holding bar on said rod, a pin horizontally journalled in said holding bar, one end of the pin being fixed to a disk and the other end projecting toward said table, a nozzle stem secured to said other end of the pin and projecting over said table, a nozzle extending at right angles to said stem, an outlet tube projecting through an end wall of the enclosure and extending to a position over said table, an exhaust pump connected to said outlet tube, a source of gas under pressure, means for transmitting the gas to said nozzle in a continuous flow stream, means for sifting abrasive particles into said gas stream at a determinable rate, means for starting and stopping the gas stream flow, means for measuring the time of gas flow, means for starting and stopping the time measuring means, and a single means for activating both said gas flow and time measurement starting and stopping means.

2. Abrasion resistance determination apparatus comprising an enclosure, means for supporting a specimen within said enclosure, a holding bar mounted within said enclosure, means for adjusting the holding bar and supporting means relative to each other in a vertical direction, a pin journalled in said holding bar and having a wheel fixed at one end, said wheel having edge markers on its periphery, a reference plate extending from said holding bar over said markers whereby predetermined graduations of wheel rotation may be made, a nozzle secured for rotation with the other end of said pin, said nozzle extending to an operative position over said table, an exhaust means over said table, and means for transmitting a continuous flow of gas and abrasive particles to said nozzle at a determinable rate and pressure.

References Cited in the file of this patent

UNITED STATES PATENTS

| | | |
|---|---|---|
| 527,581 | Benson | Oct. 16, 1894 |
| 2,187,514 | Gardner | Jan. 16, 1940 |
| 2,628,456 | Berg | Feb. 17, 1953 |
| 2,633,015 | Morris | Mar. 31, 1953 |
| 2,696,049 | Black | Dec. 7, 1954 |
| 2,712,751 | Bracco et al. | July 12, 1955 |

OTHER REFERENCES

Publication, Article "Abrisimeter Measures Wear Resistance," Automotive Industries, December 7, 1935, page 762.